US012634601B2

(12) United States Patent
Zhu et al.

(10) Patent No.: US 12,634,601 B2
(45) Date of Patent: May 19, 2026

(54) ON-THE-FLY DEFECTIVE PIXEL CORRECTION

(71) Applicant: SRI International, Menlo Park, CA (US)

(72) Inventors: Rui Zhu, Princeton, NJ (US); Peter A Levine, West Windsor, NJ (US); Colin Earle, Yardley, CA (US)

(73) Assignee: SRI International, Menlo Park, CA (US)

( * ) Notice: Subject to any disclaimer, the term of this patent is extended or adjusted under 35 U.S.C. 154(b) by 180 days.

(21) Appl. No.: 18/242,940

(22) PCT Filed: Mar. 23, 2022

(86) PCT No.: PCT/US2022/021504
§ 371 (c)(1),
(2) Date: Sep. 6, 2023

(87) PCT Pub. No.: WO2022/204256
PCT Pub. Date: Sep. 29, 2022

(65) Prior Publication Data
US 2024/0323557 A1 Sep. 26, 2024

Related U.S. Application Data

(60) Provisional application No. 63/166,208, filed on Mar. 25, 2021.

(51) Int. Cl.
H04N 25/683 (2023.01)
H04N 25/63 (2023.01)
H04N 25/68 (2023.01)

(52) U.S. Cl.
CPC ........... *H04N 25/683* (2023.01); *H04N 25/63* (2023.01); *H04N 25/68* (2023.01)

(58) Field of Classification Search
CPC ....... H04N 25/683; H04N 25/63; H04N 25/68
See application file for complete search history.

(56) References Cited

U.S. PATENT DOCUMENTS

| | | | |
|---|---|---|---|
| 4,253,120 | A | 2/1981 | Levine |
| 4,600,946 | A | 7/1986 | Levine |
| 4,739,495 | A | 4/1988 | Levine |
| 7,129,975 | B2 | 10/2006 | Levine |

(Continued)

OTHER PUBLICATIONS

WIPO Patent Cooperation Treaty, International Search Report, Jul. 15, 2022, 2 pages.

*Primary Examiner* — Timothy J Henn
(74) *Attorney, Agent, or Firm* — Rutan and Tucker, LLP

(57) ABSTRACT

An image sensor with a pixel array that has two or more pixels is discussed. The defective pixel detector detects a defective pixel. A dynamic threshold range is based on amplitude levels of neighboring pixels. The defective pixel detector detects the defective pixel with the dynamic threshold range to detect and determine a defective status for the pixel under analysis based on an amplitude level of the pixel under analysis relative to the amplitude levels of neighboring pixels. The defective pixel detector applies algorithms to create candidate pixel patterns for the neighboring pixels used to create the dynamic threshold range. The value of the dynamic threshold range will change based on the amplitude levels of the neighboring pixels.

17 Claims, 9 Drawing Sheets

(56) References Cited

U.S. PATENT DOCUMENTS

| | | | |
|---|---|---|---|
| 2006/0017826 A1* | 1/2006 | Sekimoto | A61B 1/041 |
| | | | 348/E5.081 |
| 2011/0090371 A1 | 4/2011 | Cote et al. | |
| 2014/0211048 A1* | 7/2014 | Kolli | H04N 25/683 |
| | | | 348/246 |
| 2019/0025587 A1 | 1/2019 | Osterhout et al. | |
| 2020/0053302 A1* | 2/2020 | Lin | H04N 9/646 |
| 2020/0336684 A1* | 10/2020 | Wang | H04N 23/843 |

* cited by examiner

ON-THE-FLY DEFECTIVE PIXEL CORRECTION

CROSS-REFERENCE

This application is a 35 U.S.C. § 371 U.S. National Stage of international Patent Application No. PCT/US22/21504, titled "ON-THE-FLY DEFECTIVE PIXEL CORREC-TION," having an international Filing Date of Mar. 23, 2022, which claims the benefit under 35 USC 119 to U.S. provisional patent application Ser. No. 63/166,208, titled "ON-THE-FLY DEFECTIVE PIXEL CORRECTION," filed 25 Mar. 2021, which the disclosure of such is incorporated herein by reference in its entirety, the entire contents of both which are hereby incorporated by reference for all purposes.

GOVERNMENT RIGHTS

This invention was made with government support under transaction agreement W909MY-18-9-0001 awarded by the U.S. Army Contracting Command. The government has certain rights in the invention.

TECHNICAL FIELD

An embodiment of a concept herein relates to techniques and tools in an image sensor.

BACKGROUND

An approach that can be used is to contrast between a pixel and its neighbors or their linear extrapolation as a defect determiner. A fixed threshold is used to determine if a pixel is defective and substitute a correction value. If a specific contrast value is exceeded, the pixel is determined defective. Generally, the threshold is set high enough so signal shot noise does not trigger false positives. This approach tends to remove too much useful details from the image. This approach tends to remove too much useful details, especially under low light conditions when the signal of interest is close to the background because linear extrapolation based on neighboring pixels does not work well. This approach will not remove Random Telegraph Noise (RTN) or low-level high dark current pixels seen in low light level images if the threshold is set too high.

Another approach used to correct the defective pixels is to store a map of defective pixel locations and replace them with a surrounding pixel. This requires non-volatile memory built onto the chip housing the pixel array and is limited to those defective pixels detected during calibration at manufacture. The stored map cannot correct new defective pixels generated; for example, by changing operating voltages or aging, after the image sensor has been put into operation. This approach will not remove RTN on a per frame basis.

Other approaches have been used. For example, see U.S. Pat. No. 7,129,975, filed in 2002, titled "Addressable imager with real time defect detection" and substitution assigned to RPX Corporation and U.S. Pat. No. 4,253,120, filed in 1979, titled "Defect_detection_means_for_charge_transfer imag-ers." U.S. Pat. No. 7,129,975 does not disclose detecting for a noise level in the pixels and as shown in FIG. 2B "the minimum [light] spot 212 is substantially confined to a single pixel." ('975 Col. 4 Lns 11-12).

SUMMARY

Provided herein are various methods, apparatuses, and systems for an image sensor with a pixel array.

In an embodiment, a camera can have an image sensor with a pixel array. The pixel array has two or more pixels making up that array. The defective pixel detector detects a defective pixel. A dynamic threshold range is based on amplitude levels of neighboring pixels. The defective pixel detector detects the defective pixel with the dynamic threshold range to detect and determine a defective status for the pixel under analysis based on an amplitude level of the pixel under analysis relative to the amplitude levels of neighboring pixels. The defective pixel detector applies algorithms to create candidate pixel patterns for the neighboring pixels used to create the dynamic threshold range. The value of the dynamic threshold range will change based on the amplitude levels of the neighboring pixels, where the neighboring pixels are selected from pixels that are up to four pixels away the pixel under analysis but less than an entire set of pixels in the array.

These and many more embodiments are discussed.

DRAWINGS

Various example embodiments can be more completely understood in consideration of the following detailed description in connection with the accompanying drawings, in which.

Figure 1:
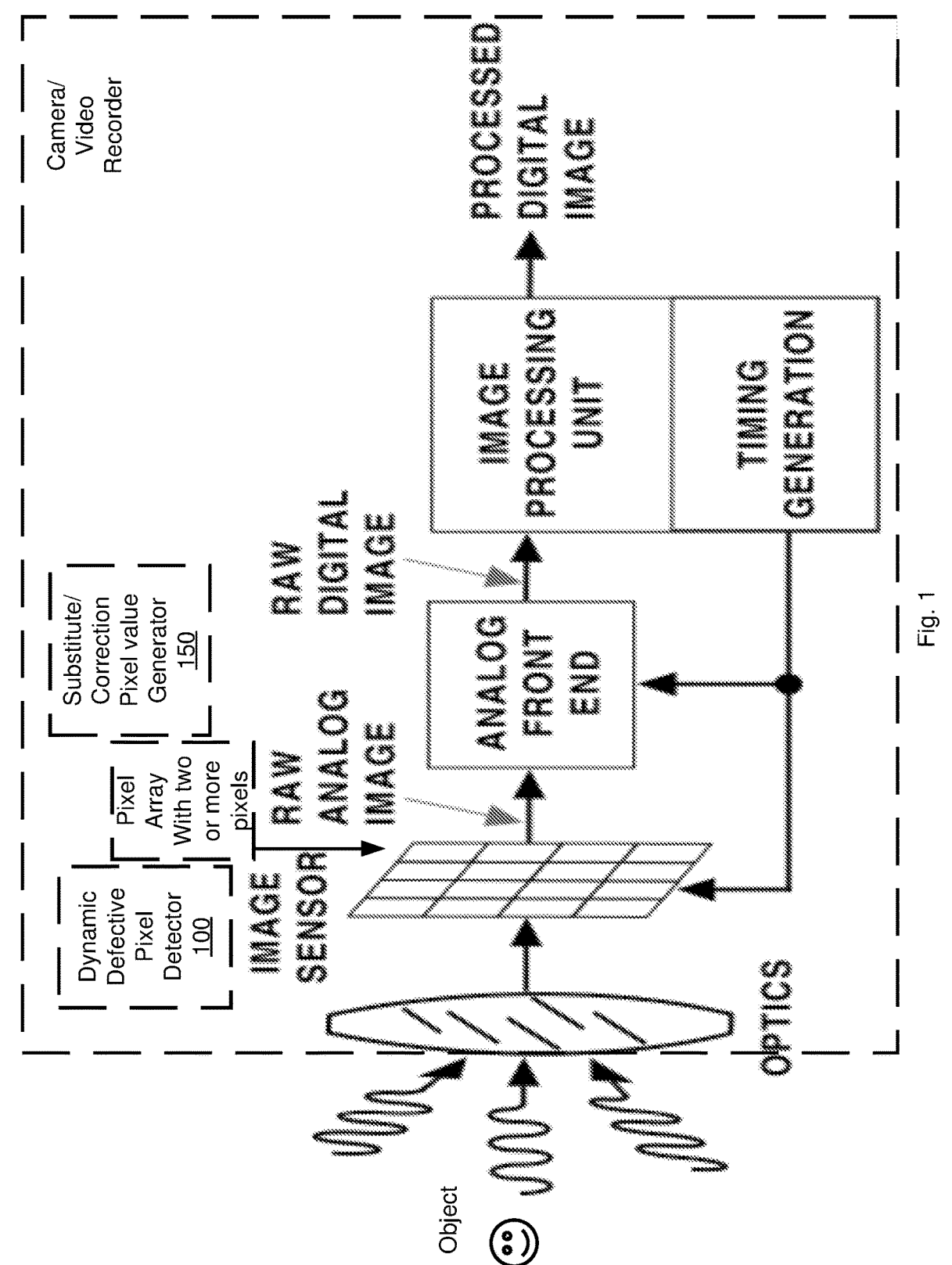
FIG. 1 illustrates a block diagram of an embodiment of an example camera with one or more on-the-fly defective pixel detectors to detect a defective pixel, after the image sensor with the pixel array has been put into operation, based on a noise level (e.g., noise signature) of neighboring pixels in the pixel array.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

FIG. 1 illustrates a block diagram of an embodiment of an example camera with one or more on-the-fly defective pixel detectors to detect a defective pixel, after the image sensor with the pixel array has been put into operation, based on a noise level (e.g., noise signature) of neighboring pixels in the pixel array.

The camera can capture an image of an object through an optical lens, an image sensor, an analog front end process (and analog to digital conversion in the analog front end), an image processing unit, a timing generator, an on-the-fly defective pixel detector 100 on the image sensor chip and/or in the image processing unit, a timing generator controlling the imaging timing generated on the image sensor chip, and a substitute pixel value generator 150 on the image sensor chip and/or in the image processing unit.

In an embodiment, the on-the-fly defective pixel detector 100 is located on the image sensor chip and the substitute pixel value generator 150 creates the correction to the pixel values on the raw digital image rather than during the creation of the raw digital image.

In the pixel array, each of these pixels can and will be under analysis from the defective pixel detector, as well as, if determined to be defective then the pixel correction value is generated for the pixel value of the defective pixel. Every pixel in the array will eventually be part of a moving set of neighboring pixels used a reference test set of pixels. Each pixel is tested based on surrounding pixels' outputs.

One or more on-the-fly defective pixel detectors 100 detect a defective pixel, after the image sensor with the pixel array has been put into operation, based on an amplitude level (e.g., light signal and noise signal in a pixel) of an individual pixel under analysis, relative to the amplitude levels of neighboring pixels. Noise for surrounding pixels can be used to set threshold to trigger detection. The pixel under analysis/test is not used for the noise measurement.

The detection algorithm in the on-the-fly defective pixel detector 1000 evaluates a kernel for every pixel in every frame. If the pixel amplitude of the pixel under analysis is outside a dynamic threshold range relative to neighboring pixels it is considered defective. The detection threshold range is adjusted based on surrounding pixel noise. For a dark field dominated by read noise (e.g., low ambient light conditions), the detection threshold range is set low enough to detect RTN. For higher ambient light conditions, and therefore higher shot noise, the detection threshold range is increased so shot noise is not interpreted as a defective pixel. This approach requires knowing ambient light signal levels and noise levels in the kernel of neighboring pixels around the pixel under analysis.

The on-the-fly defective pixel detector 100 can apply different algorithms, such as i) a square root of a signal, ii) a peak-to-peak of a signal, iii) a range of median values of the pixel values of the two or more neighboring pixels, iv) an average value of the pixel values, etc. with a corresponding candidate pattern (e.g., kernels) of neighboring pixels to create the dynamic threshold range, based on at least the noise level and then can factor in a light signal level as well. The values making up the dynamic threshold range can change based on the noise levels of neighboring pixels. The pattern of neighboring pixels (e.g., a pool of neighboring pixels) is indicated by the kernel. (See, for example, FIGS. 4-7).

The on-the-fly defective pixel detector 100 can assess the pixel values of multiple neighboring pixels to determine whether the pixel value of this individual pixel under analysis is defective or not. This method detects a departure of a pixel value of a single pixel from its neighbor pixels.

There are two noise problems that the system and methods addressed here:

1. RTN: A very low noise is needed to see Random Telegraph Noise (RTN). RTN is seen at low light levels such as light conditions for night vision. RTN appears as random flashing pixels in the image.

2. High dark current pixels (white spots): These pixels vary intensity with temperature and imager integration time and are generally not acceptable in cameras. i) RTN pixel location is different for each frame and ii) high dark current pixel brightness is temperature-dependent. This means depending temperature, the particular pixel under analysis may or may not require a substitution for its pixel value.

At low light levels used for night vision, RTN appears as random flashing pixels in the image. The random flashing pixels due to RTN can be disturbing to the eye. In addition, the substitute pixel value generator will generate substitute pixel values merely for frames that require correction.

Note, RTN in a pixel may occur every 10 to 100 frames or more, so replacing every frame in which RTN occurs will remove orders of magnitude of frames from the final image produced.

Pixels can also have high amounts of dark current and appear as white spots in an image. These pixels with high amounts of dark current can vary the intensity with temperature and imager integration time making them generally not acceptable in imagers.

The on-the-fly defective pixel detector 100 and the substitute pixel value generator 150 cooperate to provide a way to detect pixels with high RTN and high dark current pixels (bright pixels) on a real-time pixel by pixel, frame by frame basis within a light level of a scene and then add/substitute a pixel correction value for the pixel value of the defective pixel.

Note, a pixel with a high dark current pixel can be detected and then the pixel location and amplitude information can be stored in a memory as a function of temperature, and subsequently, this information can be used for correction. A disadvantage of dark current pixel storage and replacement is the need to calibrate and store amplitude and location at multiple temperatures. Amplitude versus temperature is not the same for every high dark current pixel because the defect mechanism is not always the same.

The method and system use the noise of the pixel as the dynamic determinant of a good pixel or bad/defective pixel. The substitute pixel value generator 150 provides correction in real-time, which allows RTN noise that changes frame to frame to be corrected. The substitute pixel value generator 150 provides correction for other defects, such as dark current spots, which are more stable than RTN but can vary with temperature and appear due to aging. These types of varying defects are also corrected by on-the-fly defect detection and substitution performed by the on-the-fly defective pixel detector 100 and the substitute pixel value generator 150. Thus, the on-the-fly defective pixel detector 100 and the substitute pixel value generator 150 cooperate to differentiate scene content from pixel defects and then substitute information from neighboring pixels for the defective pixel.

A CMOS imager can have a high pixel yield. However, due to factors such as high dark current pixels and random telegraph noise (RTN) there are generally pixels that require correction. The on-the-fly defective pixel detector 100 can be a defective pixel indicator using neighboring pixels and communicate with a substitute pixel value generator 150 that uses neighboring pixels. The process uses two steps. First, an on-the-fly defective pixel detector 100 can determine a pixel to be defective. Second, a substitute pixel value generator 150 can use neighboring pixels to form a correction signal, e.g., pixel correction value for the defective pixel, to replace the pixel value of the defective pixel. A median or linear extrapolation of the neighboring pixel values can be used to detect the defective pixel and/or correct a pixel value for the defective pixel.

The on-the-fly defective pixel detector 100 can provide an approach for the detection of a defective pixel and pixel value replacement based on RTN. RTN is random from frame to frame and has a peak to peak amplitude of a few electrons.

Note, dark current can be caused by the arrival process of light photons on the image array sensor. The dominant noise in the brighter parts of an image from an image sensor is typically caused by statistical quantum fluctuations, that is, variation in the number of photons sensed at a given exposure level. This is sensed as noise.

The substitute pixel value generator 150 and the on-the-fly defective pixel detector 100 can cooperate to produce and maintain higher numbers of non-defective pixels over a life span of an image sensor using on-the-fly detection and correction.

Because the on-the-fly defective pixel detector 100 and the substitute pixel value generator 150 cooperate to evaluate pixels in the array in real-time during an operational life of the array, calibration for each camera is not needed at manufacture.

The on-the-fly defective pixel detector 100 and the substitute pixel value generator 150 cooperate to identify defective pixels using neighboring pixels to do on-the-fly defective pixel correction for a CMOS imager. The on-the-fly defective pixel detector 100 is dynamic in that each pixel has a detection threshold determined by neighboring pixel noise. Because defective pixels are usually a single isolated pixel (while scene content is more diffuse due to lens modulation transfer function (MTF) and diffraction as well as optical crosstalk between pixels), on-the-fly correction is possible.

Figure 2:
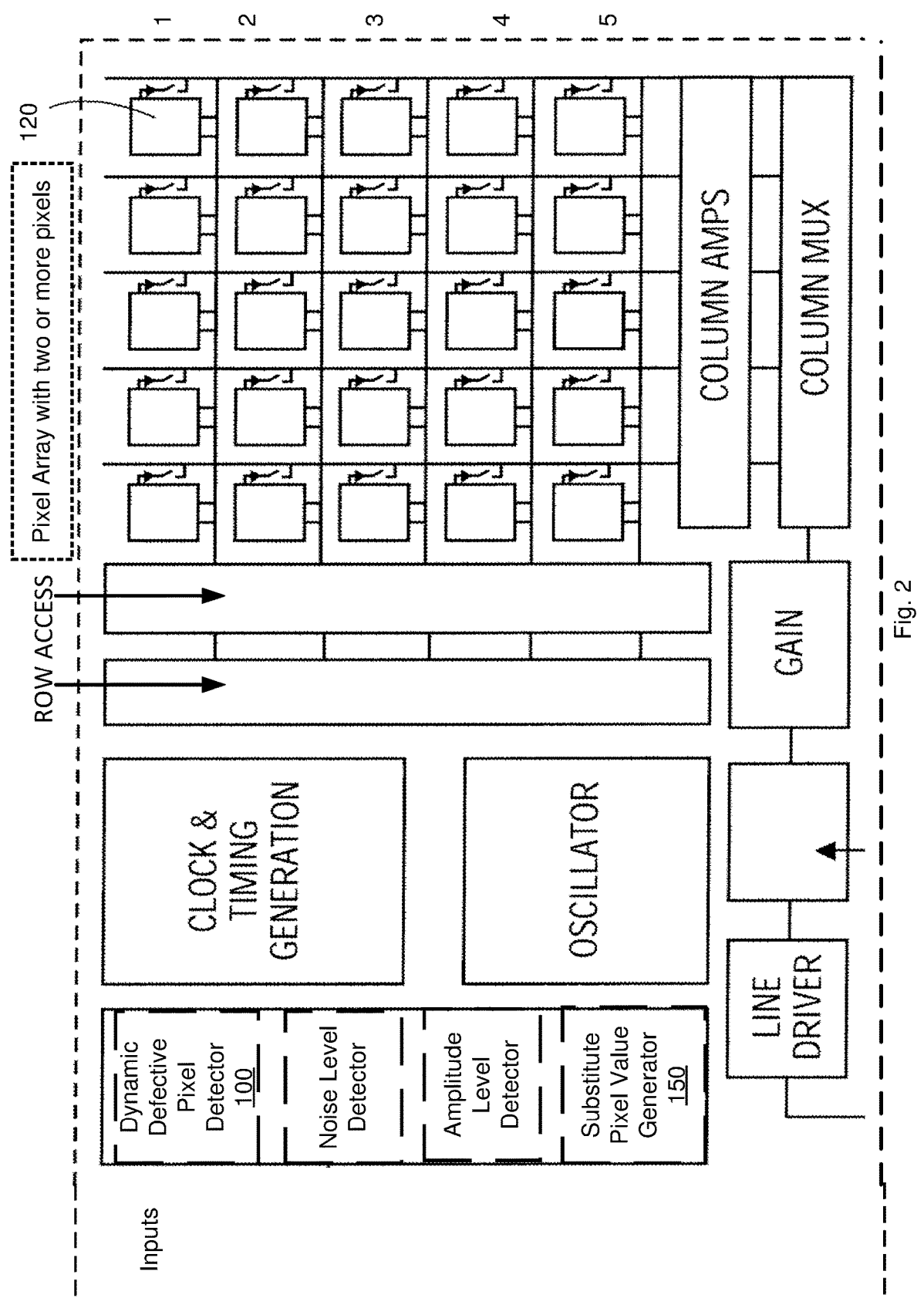
FIG. 2 illustrates an embodiment of an example image sensor with a pixel array that has two or more pixels in that array, and an on-the-fly defective pixel detector cooperating with a substitute pixel value generator.

FIG. 2 illustrates an embodiment of an example image sensor with a pixel array that has two or more pixels, and an on-the-fly defective pixel detector cooperating with a substitute pixel value generator.

The image sensor also has a noise level detector, a clock and timing generator, an oscillator, an amplitude detector, a line driver, and a row and column access control system to access and read out the values of the two or more pixels, such as a first pixel 120, for the image sensor. Note, the pixel box shows a diode outside the pixel itself but in an embodiment the diode can be fabricated within the pixel itself. Note, the density of pixels in an array is such that any given light signal from an image captured by the array is detected by more than one pixel. In fact, a spot of light within that image will be spread over an entire group of neighboring pixels.

One or more on-the-fly defective pixel detectors 100 can detect a defective pixel (which initially under testing at the factory tested good), after the image sensor with the pixel array has been put into operation, based on an amplitude level of an individual pixel under analysis, relative to the amplitude levels of neighboring pixels. Subsequently, the substitute pixel value generator 150 is notified that a pixel is defective, and dynamically corrects the value of the defective/bad pixels in the pixel array over the operational life span of the device (e.g., on the fly). Note, this is especially helpful for low light imaging. Thus, the substitute pixel value generator 150 dynamically corrects the value of the defective/bad pixel by substituting in a less noticeable value.

Note, a noise detector can use i) a statistical determination or ii) an actual measurement of pixel read noise level and then factor in shot noise (RTN and dark current noises) to determine the noise level of the individual pixel under analysis and then supply that to the on-the-fly defective pixel detector 100. In an embodiment, the noise is photon shot noise, read noise and dark current shot noise, which is added in quadrature. The noise level detected by the noise detector includes at least a dark current noise determined by one of i) a measurement of the dark current noise or ii) a mathematical (e.g., statistical) determination of the dark current noise of the pixel under analysis. Note, the pixel value readout of a pixel includes a captured light level and a noise level present in the pixel. The noise detector can calculate the approximate noise signal level in that pixel based on the measured pixel value. A variance in pixel values and thus amplitude levels in neighboring pixels depending on the density of pixels per unit of area is indicative noise signal level in each of the neighboring pixels. Again, a single light beam from an image will generally be detected by the pixel under analysis as well as by its neighboring pixels.

The on-the-fly defective pixel detector 100 identifies one or more defective pixels using at least a noise level detector to assess the individual pixel under analysis as well as the neighboring pixels on-the-fly. The defective pixel detector can also identify one or more defective pixels using at least an amplitude level detector to assess the individual pixel under analysis as well as the neighboring pixels.

The substitute pixel value generator 150 provides on-the-fly pixel value correction over an operational life span of the pixel array with the two or more pixels when the one or more defective pixels become defective during the operational life span of the pixel array.

The substitute pixel value generator 150 generates a pixel correction value dynamically based on pixel values of two or more neighboring pixels to determine and then substitutes the pixel correction value for a pixel value of the defective pixel.

At least one of i) a median value of the pixel values of the two or more neighboring pixels and ii) an average value of the pixel values of the two or more neighboring pixels is substituted as the pixel correction value for the pixel value of the defective pixel.

The defective pixel detector can use both algorithms (below) to consider the pixel, under analysis and its neighbor pixels, and then single out individual pixels standing out as too low in noise level or too high in noise level compared to its neighboring pixel's noise levels. The on-the-fly defective pixel detector can use a dynamic threshold range to detect and determine a defective status for the pixel under analysis based on the noise levels of neighboring pixels. Use of the dynamic threshold range to detect a bad/defective pixel allows the detection algorithm to be effective at both high light level conditions as well as at low light level conditions.

Algorithm 1—a Square Root (Sqrt) of Signal

Find the maximum and the minimum value of the judgment kernel, define the normal range as min–factor*sqrt (min) and max+factor*sqrt(max). The normal range takes consideration of pixel shot noise. If a pixel read-out is outside of the normal range, it is defective. (e.g., See FIG. 3)

The defective pixel detector can use an offset value and/or mathematical operator when taking a square root for a low signal level. At a low light signal level, the pixel read noise dominates and the pixel noise level is not proportional to a square root of the signal.

Algorithm 2—Peak-to-Peak of Signal

Find the maximum, the minimum, (p2p=max–min) and the median value of the judgment kernel, define the normal range as median–factor*p2p–tweak and median+factor*p2p+tweak. The normal range takes consideration of pixel shot noise (in the form of p2p). If a pixel read-out is outside of the normal range, it is defective.

The defective pixel detector does not need to worry about using an offset value and/or mathematical operator when the lighting conditions are bright, but the median or average has to be found for every pixel's judgment kernel. The defective pixel detector can detect the defective pixel with the dynamic threshold range to detect and determine a defective status for the pixel under analysis based on an amplitude level of the pixel under analysis relative to the amplitude levels of neighboring pixels.

Once a pixel is determined to be defective, the median value of the replacement kernel or average value of the replacement kernel is calculated, and the pixel value is replaced.

Likewise, the substitute pixel correction value generator can generate a pixel correction value dynamically based on pixel values of one or more neighboring pixels in order to determine and then substitute the pixel correction value for a pixel value of the defective pixel. In an embodiment, once an individual pixel is determined to be defective, then the median value of the replacement kernel is calculated, and the individual pixel is replaced. In an embodiment, once an individual pixel is determined to be defective, then the average value of the replacement kernel is calculated, and the individual pixel is replaced.

Again, the on-the-fly defective pixel detector can detect the defective pixel with the dynamic threshold range to detect and determine a defective status for the pixel under analysis based on an amplitude level of the pixel under analysis relative to the amplitude levels of neighboring pixels. The on-the-fly defective pixel detector applies one or more algorithms to create candidate pixel patterns for the neighboring pixels used to create the dynamic threshold range. Thus, the dynamic threshold range that is compared to an amplitude value of the pixel under analysis will change based on the amplitude levels of the neighboring pixels.

The on-the-fly defective pixel detector 100 determines the amplitude value of the pixel under analysis (and then factors in when the scene is a bright light signal level condition or a low light signal condition) in order to compare that information to a dynamic threshold range plus or minus a fractional value. When a comparison shows that the amplitude level of the pixel (e.g., light signal captured plus the noise level of the pixel) under analysis is outside that dynamic threshold range plus or minus a fractional value, then the pixel under analysis is considered to be a defective pixel, which needs a pixel correction value to be generated.

The fundamental principle is the same for both algorithms, taking consideration of the noise level of the neighboring pixels to the pixel under analysis, and single out each pixel standing out compared to its neighboring pixel's noise.

Algorithm 2, which calls for two kernel median calculations, does not require knowing "offset", the "tweak" may or may not change with the actual camera offset setting.

Note, a CCD image sensor, CMOS image sensor, a gas imager, and/or a thermal imager may use the on-the-fly defective pixel detector 100 and the substitute/pixel correction value generator. Each pixel array on an image sensor can be made up of millions of pixels. The on-the-fly defective pixel detector 100 and the substitute/pixel correction value generator routinely during the operation of the image sensor performs millions of calculations on the pixels because the calculations performed on an individual pixel under analysis must also figure out what are the neighboring pixels average noise levels and the dynamic threshold range to determine whether each individual pixel is good or bad/defective, and then if defective what is the pixel correction value.

Note, low light level conditions may be less than ~10 Lux. Bright light level conditions may be 10,000 Lux. Note, the good news is that at a high light signal level the defective pixels (RTN pixels and hot pixels) are easily buried in shot noise and are not an eyesore anymore. Correction of them can become unnecessary.

Figure 3:
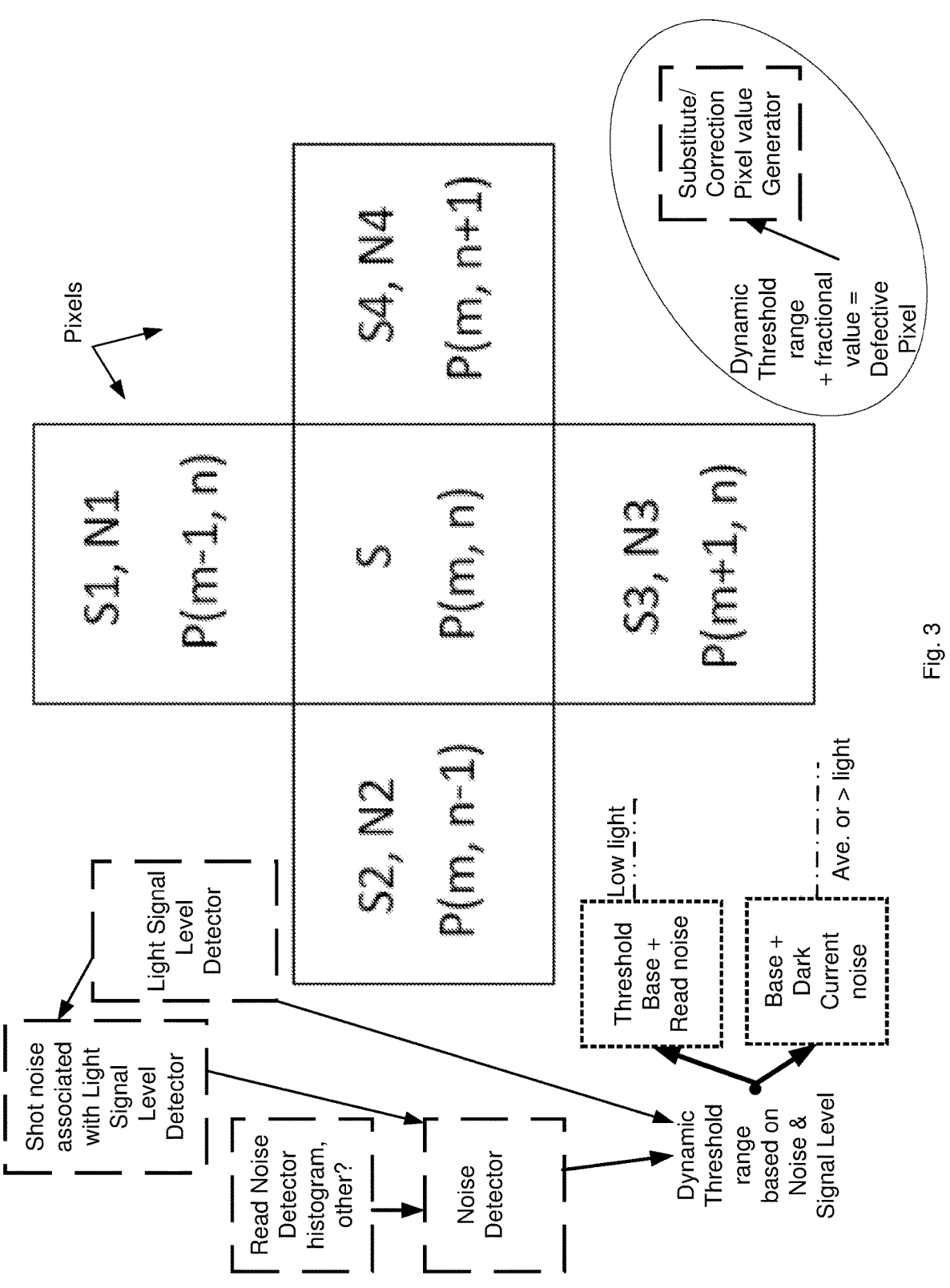
FIG. 3 illustrates an embodiment of an example on-the-fly defective pixel detector cooperating with an example substitute pixel value generator that uses a dynamic threshold range to determine that the pixel under analysis is defective, and then substitute 1) the pixel correction value for 2) the pixel value of the defective pixel.

FIG. 3 illustrates an embodiment of an example on-the-fly defective pixel detector cooperating with an example substitute pixel value generator that uses a dynamic threshold range to determine that the pixel under analysis is defective, and then substitute 1) the pixel correction value for 2) the pixel value of the defective pixel.

The dynamic defective pixel detector works with a read noise detector, a light signal level detector, and a shot noise detector (e.g., a combined RTN noise detector and a dark current noise detector) in order to determine a dynamic threshold range based on both noise level and light signal level sensed by a group of pixels. The dynamic threshold can be the threshold range base plus read noise when the pixels are in low light conditions. The dynamic threshold range can be the threshold range base plus the dark current noise when the pixels are equal to or greater than an average light condition such as bright light conditions. In the middle, FIG. 3 shows an example group of pixels with four pixels surrounding a pixel under analysis. On the lower right, FIG. 3 also shows the dynamic threshold range plus the fractional value that is used to determine a defective pixel, and once a defective pixel is determined, the dynamic threshold range can be used to determine a substitute pixel value generator 150.

The noise detector takes into account multiple different types of noise. The RTN noise detector, a dark current noise detector, and a pixel-read noise detector can detect the noise level of the individual pixel under analysis, and the noise levels of neighboring pixels. The RTN noise detector, the dark current noise detector, and the pixel-read noise detector can combine to provide a noise input into the on-the-fly defective pixel detector 100 along with a light signal level from the light signal level detector. An RTN noise detector and the dark current noise detector combine to provide a shot noise input into the substitute correction value generator.

One or more noise detectors can use at least one of 1) an actual measurement of the noise level as well as 2) a mathematical (e.g., statistical) determination of the noise level of this pixel's value. An RTN noise detector and a dark current noise detector can cooperate to obtain a more accurate value for shot noise based on signal ADC camera offset, which needs to be subtracted from the value of the pixel under analysis. At the low signal level when read noise dominants over shot noise, the histogram of pixel read noise can be obtained, the multiplication factor can be adjusted to approximate shot noise. Since the value used to identify defective pixels does not need to also be used for correction, the approximation error has little effect.

The difference between the amplitude of the highest and lowest pixel values of neighboring pixels can also be treated as instantaneous local peak-to-peak noise. This value can be multiplied by a constant and used as the dynamic threshold range to define a defective pixel.

The read noise detector reads the pixel read noise of a pixel. The pixel read noise of a pixel can be a combination of noise from the pixel and from the ADC. The pixel read noise of the image sensor can be the equivalent noise level (in electrons RMS) at the output of the camera in the dark and at zero integration time.

The on-the-fly defective pixel detector 100 can couple to and communicate with a substitute pixel value generator 150 in order to generate a pixel correction value for the defective pixel based on a dynamic threshold range determined from the inputs of the RTN noise detector, the dark current noise detector, the pixel read noise detector, and the light signal level detector. Again, the on-the-fly defective pixel detector 100 applies an algorithm with a corresponding pixel candidate pattern of the neighboring pixels to create the dynamic threshold range used to detect the defective pixel. Thus, the dynamic threshold range can be based on the noise levels of the neighboring pixels and a light signal level captured by the neighboring pixels.

The on-the-fly defective pixel detector 100 assesses the pixel values of multiple neighboring pixels to determine whether the pixel value of this individual pixel under analysis is defective or not. This method detects the departure of an amplitude level of a pixel value of a single pixel from the amplitude levels of its neighbor pixels. The thought requires one to realize when you see a pixel value of a pixel that changes dramatically relative to its neighbors that's not real but rather an indication of a defect because no optical source will focus light down to a single pixel and not affect the neighboring pixels.

Consider in FIG. 3 a pixel $P(m, n)$ and its up, down, left, right neighboring pixels $P(m-1, n)$, $P(m+1, n)$, $P(m, n-1)$ and $P(m, n+1)$. These 4 pixels have amplitude signal levels S1, S2, S3, S4, and corresponding RMS noise N1, N2, N3, N4. For the center pixel $P(m, n)$ of under analysis, when the amplitude signal level S of pixel $P(m, n)$ blends in within the amplitude signal levels of the surrounding pixels $P(m-1, n)$, $P(m+1, n)$, $P(m, n-1)$ and $P(m, n+1)$, then there is no need to correct the pixel value of the pixel $P(m, n)$ under analysis. For the center pixel $P(m, n)$ of under analysis, when the amplitude signal level S of pixel $P(m, n)$ stands out, it is likely a defective pixel that needs correction. Note, real scene features have slow varying neighboring pixels, and no single pixel, such as pixel $P(m, n)$, should differ from its neighboring pixels $P(m-1, n)$, $P(m+1, n)$, $P(m, n-1)$ and $P(m, n+1)$ by significantly more than the amplitude levels associated with those neighboring pixels.

The on-the-fly defective pixel detector 100 and the substitute pixel value generator 150 can use a determining value that is calculated from neighboring pixel noise. If the pixel value is outside a range defined by the noise of the neighboring pixels, the pixel under analysis is considered defective and then pixel values of neighboring pixels are used to form a substitution/pixel correction value. The pixels used to determine a pixel correction value need not be the same pixels used to set the threshold value used to detect and determine whether a pixel under analysis is defective. The threshold value used to detect and determine whether a pixel under analysis is defective can be established by a combined read noise, dark current shot noise, and photon/RTN shot noise. If the noise level is high, then the threshold value used can be raised with a fractional offset value. This is consistent with the idea that when random noise is high, then defects are more difficult or impossible to see if small enough.

When a pixel value of a pixel is shot noise dominated, which is mostly the case, pixel noise level generally follows Poisson statistics. The RMS noise level is the square root of the signal and the peak-to-peak noise level is about 5 to 6 times that of RMS noise. So based on, for example, four amplitude signal levels of neighboring pixels S1, S2, S3, S4, the substitute pixel value generator 150 and/or the on-the-fly defective pixel detector 100 can find $Smax=max(S1, S2, S3, S4)$ and $Smin=min(S1, S2, S3, S4)$. When the amplitude level S of the center pixel is between $Smax+2.5*sqrt(Smax)$ and $Smin-2.5*sqrt(Smin)$, the on-the-fly defective pixel detector 100 can consider that the amplitude level S of the center pixel blends in well with the noise levels of neighboring pixels. If the amplitude level of the center pixel is outside of this range, the substitute pixel value generator 150 can generate a pixel correction value dynamically based on pixel values of two or more neighboring pixels to determine and then substitute the pixel correction value for a pixel value of the defective pixel. One approach to form the pixel correction value for a pixel value of the defective pixel is to use the median value of the amplitude level of the surrounding pixel values S1, S2, S3, and S4. By this method, only the stand-out defective pixels are identified and corrected for all light signal levels and dark current levels.

This approach corrects the minimum number of pixels. By using a small number of surrounding pixels to form the pixel correction value for a pixel value of the defective pixel, details of the images are preserved. In this example, the square root value on the noise level is used by the on-the-fly defective pixel detector 100 to detect a defective pixel, and not for the final replacement pixel correction value for the defective pixel, so it can be an approximated value. The factor 2.5 can be adjusted to loosen or tighten the definition of a defective pixel via the determination of the dynamic threshold range plus (in this example) a 2.5 fractional factor.

With this approach, merely the defective pixels that stand out of the scene content will be corrected. The number of corrected pixels is reduced, and the scene details are best preserved. This approach is well suited for production because the threshold does not need to be pre-established. Merely the fraction above the detected amplitude level is predetermined. The added fraction to the threshold value can be a smaller part of the threshold than, for example, setting a fixed value that needs to work for all conditions.

The fraction of the dynamic threshold range (e.g., multiple of that dynamic threshold range) can be 3% for the fractional value in general and have a relative range from 1% to 10%. This is user programmable as the algorithm calculates the range values that indicate it is a good pixel value, and then factor in how much outside of that range is the user willing to go before triggering the generation of the substitute/pixel correction value.

The fraction of the dynamic threshold range is user programmable as the algorithm calculates the range values that indicate it is a good pixel value, and then factor in how much outside of that range is the user willing to go before triggering the generation of the substitute/pixel correction value.

In an example, if the fractional value, was 0.03, then the algorithm will take the highest value of the dynamic threshold range (e.g., 110 times to the fractional value point of 0.03, which equals around 113) and the lowest value of the threshold range (e.g., 89 times to the fractional value point of 0.03, which equals around 86), and any amplitude level too high or too low would be considered defective.

Therefore, in this example, the algorithm calculates the dynamic threshold range values that indicate it is an acceptable good pixel value are between 86 and 113 based on the amplitude signatures of the neighboring pixels, and outside of that acceptable range then triggers the generation of the substitute/pixel correction value. Note, the use of the dynamic threshold range allows the defective pixel detector to detect many types of pixel defects (pixel to bright or pixel has dust and is not bright enough).

The method can apply multiple different kernels, which have different patterns and factors for what pixels are in the pool of neighboring pixels.

One or more algorithms with candidate pixel patterns supplied by a judgment kernel to create the dynamic threshold range used to compare 1) a pixel value of the pixel under analysis to 2) at least one of i) a range of median values and ii) an average value of one or more patterns of neighboring pixels (e.g., a pool of neighboring pixels being used in the comparison) indicated by the judgment kernel. Thus, other patterns than the four (up, down, left, and right) neighboring pixels patterns can be used to obtain pixel values for neighboring/surrounding pixels. For example, an algorithm with a candidate pixel pattern supplied by a judgment kernel of using the four corner pixels and even more neighboring pixels can be included to determine Smin and Smax. The range of these neighboring pixel signals can be used to estimate the peak-to-peak amplitude variations, which are indicative of noise present so that the square root calculation does not have to be computed. Another algorithm with a candidate pixel pattern supplied by the judgment kernel can use the next nearest neighbor pixels pattern for, for example, the correction dynamic threshold determination.

The on-the-fly correction implemented by the on-the-fly defective pixel detector 100 and the substitute pixel value generator 150 dynamically changes its criteria for defective pixel definition based on scene content, and it works for both high light signal levels and low light signal levels. The method effectively removes white, black, and flickering pixels and improves image visual quality.

The on-the-fly defective pixel detector 100 and the substitute pixel value generator 150 cooperate to differentiate scene content captured by a group of surrounding pixels from one or more pixel defects in that group of pixels and then substitute the pixel value information from neighboring pixels for the defective pixel(s).

Pixel RTN and dark current defects are almost always contained in a single pixel, but on the other hand, the light signal for the scene information is not contained in a single-pixel due to optics and device measure of image sharpness characteristics. The detection algorithm evaluates a kernel for every pixel in every frame. If pixel amplitude exceeds a dynamic threshold range relative to neighboring pixels, then the pixel is considered defective.

The on-the-fly defective pixel detector 100 and the substitute pixel value generator 150 both adjust the detection threshold based on surrounding pixel noise. For a dark field (e.g., low light signal) dominated by the pixel read noise, the dynamic threshold range is set low enough to detect RTN. For higher light signals, and higher shot noise, the dynamic threshold range is increased so shot noise is not interpreted as a defective pixel. This approach uses knowledge about the light signal level and noise level in the kernel around the pixel, under analysis. The detection dynamic threshold range can be set just a small fraction above the detected read noise level or shot noise level. In this case, pixels with minor defects below the noise level are not seen and do not require correction. In higher light conditions, pixels with defects above shot noise are corrected. These pixels with defects above shot noise would normally be visible in the scene content.

When testing pixels in normal lighting conditions problems, various noise sources will not show up as significant in the test due to the signal level of the light in the image being so strong/high. Shot noise is the dominant factor contributing to the level of the noise at average or greater lighting conditions. Pixel read noise is the dominant factor contributing to the level of the noise at low lighting conditions. Thus, many prior art image sensors did not have to even think about the noise effect on the signal. Mainly, when testing in very low levels of light (e.g., night vision) does the noise level of individual pixels become a substantial factor compared to the signal level of the light in the image. The reverse can also be true. Detecting pixel values at a low level of light some pixels will not show up as defective when a fixed threshold is used but when tested again at a new high level of light, then the same pixel could have a defect.

Other prior techniques when they try to figure out what a bad/defective pixel is, then they might perform the test to determine a bad/defective pixel merely at the time of manufacture; rather than, routinely again and again over the duration of the life of the image sensor (e.g., on the fly).

The on-the-fly defective pixel detector 100 is dynamic in that each pixel has a detection threshold determined by neighboring pixel noise as regularly tested during an operation of the image sensor over a life span of that image sensor. The on-the-fly detection of a defective pixel approach measures pixel read noise and shot (RTN and dark current) noise for neighboring pixels to adjust a correction threshold to determine whether a pixel is defective and then substitute a correction value.

As the light signal increases, shot noise increases as the square root of the optical signal, and the dynamic threshold range can be increased just above shot noise to minimize false corrections due to noise. Defective pixels that are lower in amplitude than then peak-peak shot noise are not corrected but also are not easily visible. Merely visible defects above shot noise are corrected. The on-the-fly defective pixel detector 100 detects and sends for correction the minimum required number of pixels which maintains MTF picture quality and data integrity.

Thus, the on-the-fly defective pixel detector 100 will maximize image quality and increase detection range for night vision imaging. The range is an important metric for comparing night vision imaging devices. Selective defect pixel replacement after the image sensor with the pixel array has been put into operation will increase imager yield at the time of manufacture and lower cost. The on-the-fly defective pixel detector 100 is able to identify defective pixels using neighboring pixels in order for the substitute pixel value generator 150 to do on-the-fly defective pixel correction for the CMOS imager. The on-the-fly defective pixel detector 100 is dynamic in that each pixel has a dynamic threshold range (e.g., detection threshold) determined by the neighboring pixel noise level.

The substitute pixel value generator 150 generates a pixel correction value when a comparison is made between i) a value of the pixel under analysis to ii) a dynamic threshold range plus a fractional factor, and when the value of the pixel under analysis is outside (e.g., higher or lower than) the dynamic threshold range plus the fractional factor, then the substitute pixel value generator 150 i) determines that the pixel under analysis is defective, and then ii) substitutes 1) the pixel correction value for 2) the pixel value of the defective pixel. The method can calculate a maximum and a minimum value for the range of the dynamic threshold range.

The dynamic threshold range can be based on noise level and light signal level. The dynamic threshold range then also can take into account a fractional factor to set the determination threshold of what is a defective pixel. When a comparison is made between the pixel's value to the dynamic threshold range plus a fractional factor, and the pixel's current value is outside (e.g., higher or lower than) the dynamic threshold range plus a fractional factor, then a determination is made that the individual pixel is defective and the pixel value needs to be replaced. When a comparison is made between the pixel's value to the dynamic threshold range plus a fractional factor, and the pixel's value is equal to or otherwise with the dynamic threshold range plus a fractional factor, then the pixel value will not be replaced.

Creating enough memory storage on the chip containing the pixel array may not be practical to store every RTN location and use this information for detection of a defective pixel and pixel value replacement. Too many pixels would need to be replaced. Note, the on-the-fly defective pixel detector 100 and the substitute pixel correction generator routinely use the algorithms discussed herein, which then inherently determines different dynamic threshold ranges for different light levels; and thus, minimizes an amount of on-chip memory to map and store known defective pixels ahead of time.

Figure 4:
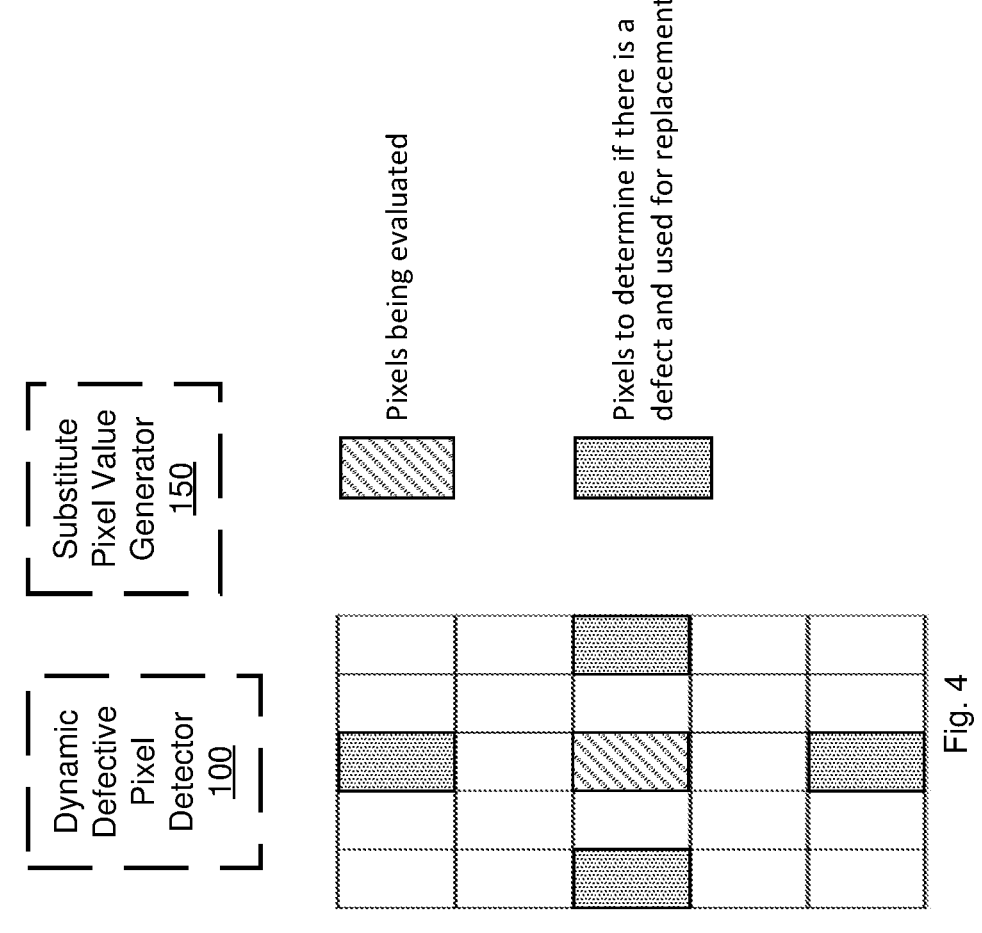
FIG. 4 illustrates an embodiment of an example on-the-fly defective pixel detector to apply one or more algorithms with candidate pixel patterns of the neighboring pixels supplied by a first judgment kernel, and/or an example substitute pixel value generator to apply one or more algorithms with candidate pixel patterns of the neighboring pixels supplied by a first replacement kernel.

FIG. 4 illustrates an embodiment of an example on-the-fly defective pixel detector to apply one or more algorithms with candidate pixel patterns supplied by an example judgment kernel, and/or an example substitute pixel value generator to apply one or more algorithms with candidate pixel patterns supplied by an example replacement kernel. Note, the neighboring pixels used to determine if there is a defective pixel do not necessarily need to be the same neighboring pixels used to create the correction signal. (See FIGS. 6 and 7).

The on-the-fly defective pixel detector 100 can apply one or more algorithms with candidate pixel patterns supplied by a judgment kernel, such as example kernels 1-4, to create the dynamic threshold range used to compare 1) a pixel value of the individual pixel under analysis to 2) at least one of i) a median value and ii) an average value of the pattern of neighboring pixels (e.g., a pool of neighboring pixels) indicated by the judgment kernel.

A user can select or program in a pixel pattern in a kernel generator for the different judgment kernels and replacement kernels, such as example kernels 1-4, discussed herein.

The on-the-fly defective pixel detector 100 applies the algorithm (e.g., Algorithm 1—Square Root of a Signal (sqrt)

or Algorithm 2 Peak to Peak of a signal) with a corresponding pixel candidate pattern/kernel (e.g., kernels 1-4) to create the dynamic threshold range. The created dynamic threshold range is used to determine whether the pixel under analysis is defective, and is based on at least an amplitude level of the pixel under analysis and the amplitude levels of the neighboring pixels. Note the dynamic threshold range can also factor in an ambient light signal level.

Judgment & Replacement Kernel 1

Kernel 1 is the simplest kernel. The on-the-fly defective pixel detector 100 applies the algorithm with kernel 1 pixel pattern because of the 2×2 quad nature of pixels with RTN, the +/−2 neighbor pixels are used for the judgment kernel. Four neighboring pixels are used to both determine if there is a defect and used for the pixel correction value. The four neighboring pixels are located two pixels away up, down, to the left, and to the right from the pixel under analysis. The substitute pixel value generator 150 uses a replacement kernel of the median value of the four shaded pixels, not the nearest neighbor pixels of the hashed pixel under analysis.

This works well at determining RTN pixels and hot pixels, for a binned and unbinned mode of operation of the pixel array.

Figure 5:
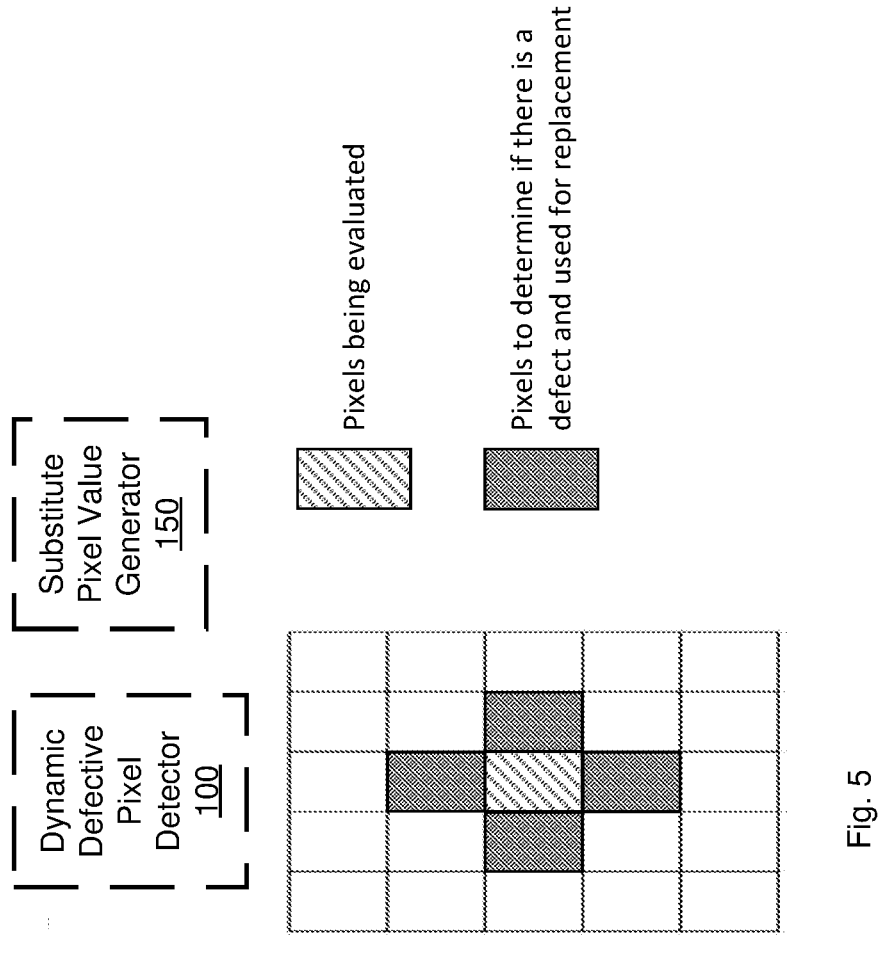
FIG. 5 illustrates an embodiment of an example on-the-fly defective pixel detector to apply one or more algorithms with candidate pixel patterns supplied by a second judgment kernel and/or an example substitute pixel value generator to apply one or more algorithms with candidate pixel patterns supplied by a second replacement kernel.

FIG. 5 illustrates an embodiment of an example on-the-fly defective pixel detector to apply one or more algorithms with candidate pixel patterns supplied by a second judgment kernel and/or an example substitute pixel value generator to apply one or more algorithms with candidate pixel patterns supplied by a second replacement kernel.

Judgment & Replacement Kernel 2

Judgment & Replacement Kernel 2 is a simple kernel pattern of pixels.

The on-the-fly defective pixel detector 100 applies the algorithm with kernel 2 pixel pattern in order to preserve the smallest feature. The on-the-fly defective pixel detector 100 applies the algorithm with kernel 2 pixel pattern in order to use the +/−1 neighbor pixels for the judgment kernel to determine if the pixel under analysis is defective. The substitute pixel value generator 150 uses a replacement kernel of the median value of 4 nearest neighbors of the hashed pixel under analysis. Note, the replacement value is the best it can be.

Four neighboring pixels are used to both determine if there is a defect and used for the pixel correction value. The four neighboring pixels are located one pixel away up, down, to the left and to the right from the pixel under analysis. The replacement kernel can be the median value of the four shaded pixels. This can be a problem in singling out RTN pixels. However, when the pixel array operates in binned mode, each pixel takes up 2×2 pixels in the display and then the RTN pixels can be a problem. However, kernel 2 works well at correcting hot pixels in unbinned mode.

Figure 6:
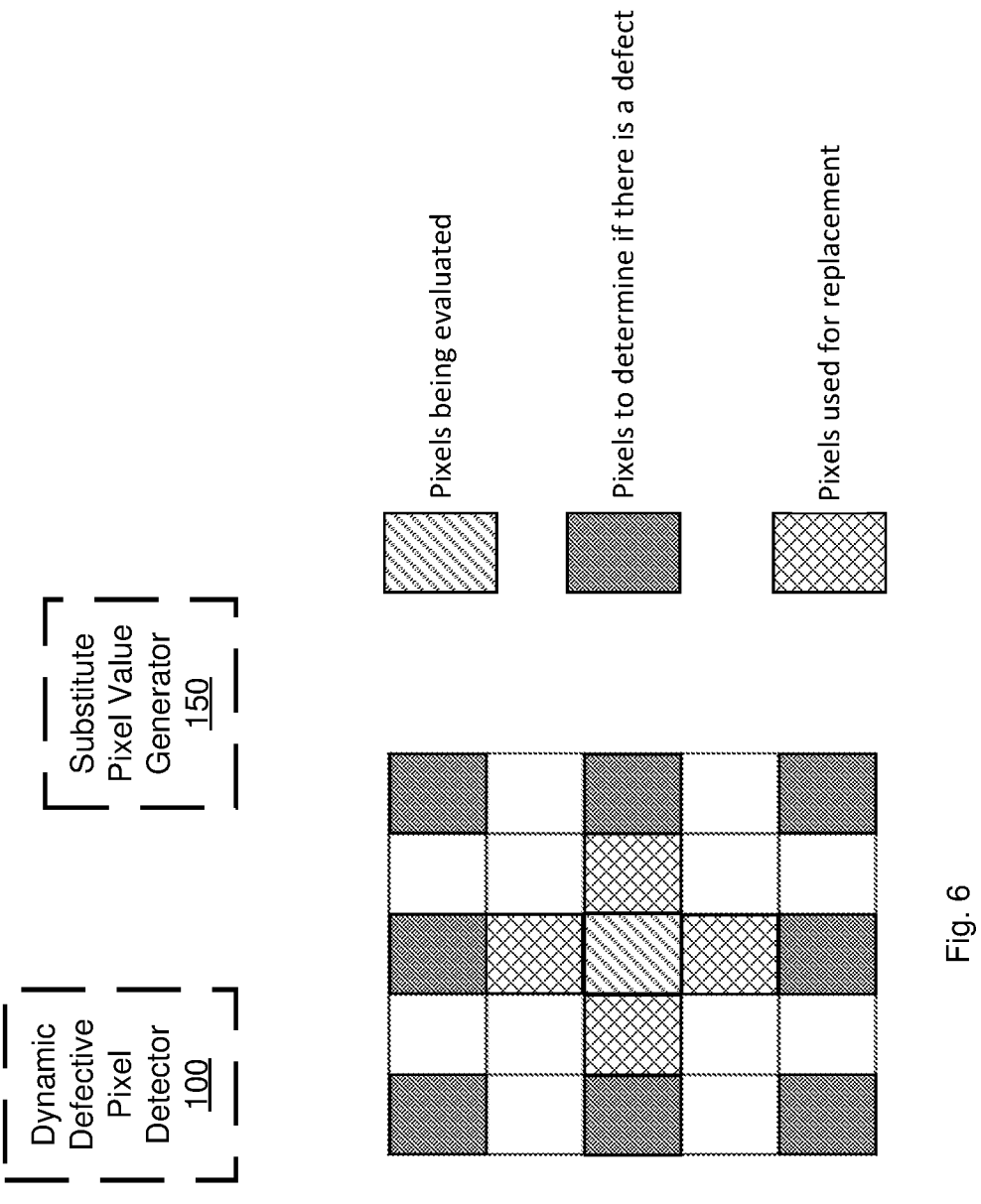
FIG. 6 illustrates an embodiment of an example on-the-fly defective pixel detector to apply one or more algorithms with candidate pixel patterns supplied by a third judgment kernel and/or an example substitute pixel value generator to apply one or more algorithms with candidate pixel patterns supplied by a third replacement kernel.

FIG. 6 illustrates an embodiment of an example on-the-fly defective pixel detector to apply one or more algorithms with candidate pixel patterns supplied by a third judgment kernel and/or an example substitute pixel value generator to apply one or more algorithms with candidate pixel patterns supplied by a third replacement kernel.

Kernel 3

Judgment & Replacement Kernel 3 is a more complex kernel pattern of pixels. The judgment kernel and the replacement kernel are different. Note, the neighboring pixels for the kernel pattern of pixels are selected from pixels that are up to four pixels away the pixel under analysis but less than an entire set of pixels in the array. The inventors have noted this range of pixels captures the spread of a single light beam from an object over the set of pixel on a consistent basis. Also, the dynamic threshold range is determined based on the captured image; and thus, changes over the life time of the device as well as changes for each new captured image.

The on-the-fly defective pixel detector 100 applies the algorithm with kernel 3 pixel pattern to use the eight pixels that are the +/−2 neighbor pixels from the pixel under analysis.

The substitute pixel value generator 150 uses a replacement kernel of the median value of 4 nearest neighbors of the hashed pixel under analysis. The replacement value is closer to reality. This works well at determining RTN pixels and hot pixels, for binned and unbinned mode. The replacement value for the RTN pixel can be a problem. Out of 4 replacement kernel pixels, 2 can have RTN and cause a median value to deviate from the reality.

Figure 7:
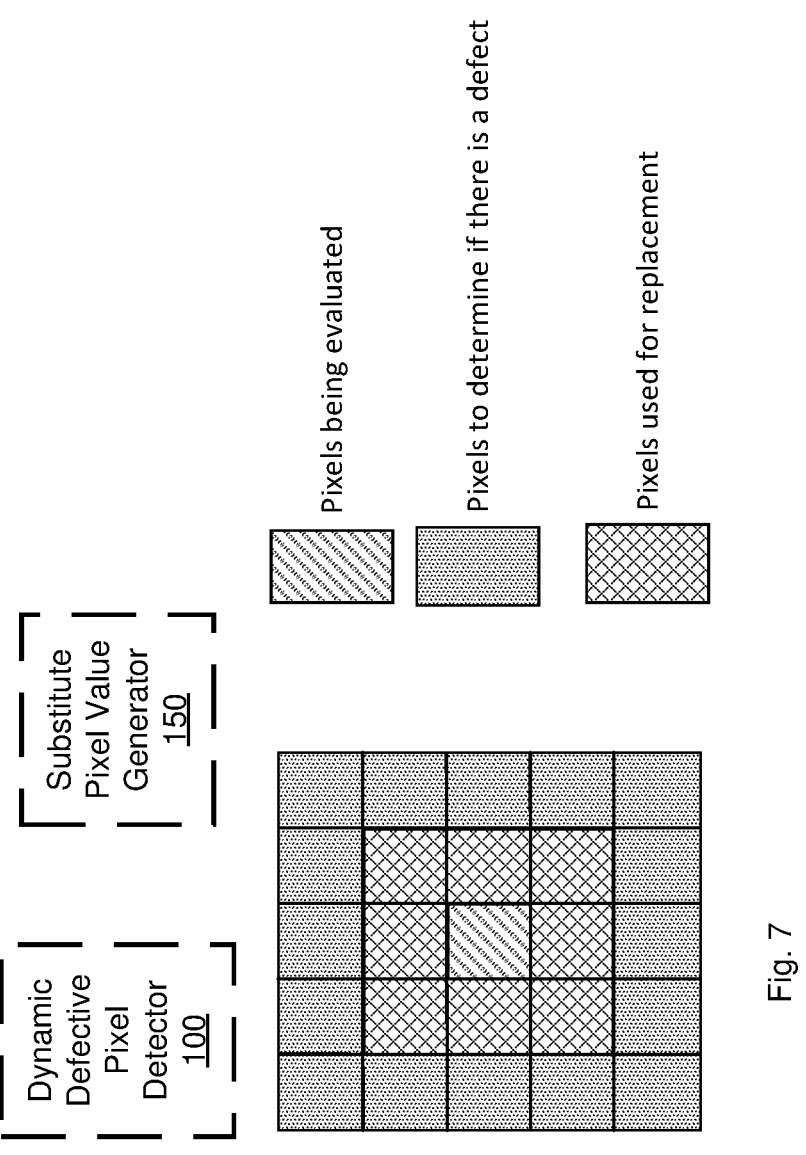
FIG. 7 illustrates an embodiment of an example on-the-fly defective pixel detector to apply one or more algorithms with candidate pixel patterns supplied by a fourth judgment kernel and/or an example substitute pixel value generator to apply one or more algorithms with candidate pixel patterns supplied by a fourth replacement kernel.

FIG. 7 illustrates an embodiment of an example on-the-fly defective pixel detector to apply one or more algorithms with candidate pixel patterns supplied by a fourth judgment kernel and/or an example substitute pixel value generator to apply one or more algorithms with candidate pixel patterns supplied by a fourth replacement kernel.
Kernel 4

Judgment & Replacement Kernel 4 is a more complex kernel pattern of pixels. The judgment kernel and the replacement kernel are different.

The on-the-fly defective pixel detector 100 applies the algorithm with kernel 3 pixel pattern to use the eight pixels that are +/−2 neighbors for the judgment kernel. Because the judgment kernel uses all sixteen surrounding pixels that are +/−2 neighbors.

Figure 8:
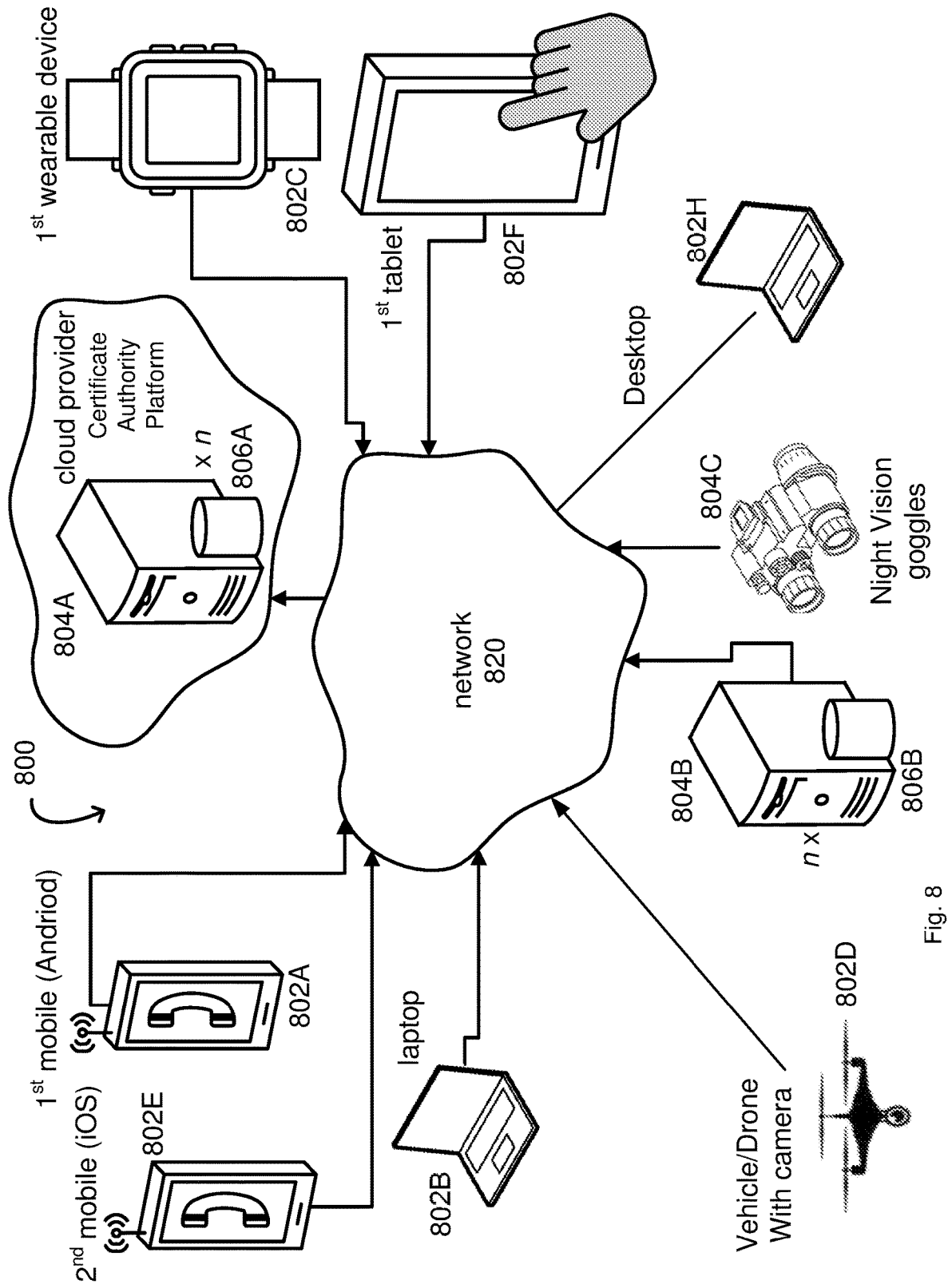
FIG. 8 illustrates a diagram of a number of electronic systems and devices communicating with each other in a network environment in accordance with an embodiment of the pixel array with two or more pixels, an on-the-fly defective pixel detector, and a substitute pixel value generator.

The substitute pixel value generator 150 uses a replacement kernel of the median value of the 8 nearest neighbor pixels around the hashed pixel under analysis. The replacement value is close to reality. Out of the 8 replacement kernel pixels, 3 can be RTN pixel, the median value of 8 excludes the effect of RTN pixel, closer to the reality. This works well at determining RTN pixels and hot pixels, for binned and unbinned mode.
Network FIG. 8 illustrates a diagram of a number of electronic systems and devices communicating with each other in a network environment in accordance with an embodiment of the pixel array with two or more pixels, an on-the-fly defective pixel detector, and a substitute pixel value generator. The network environment 800 has a communications network 820. The network 820 can include one or more networks selected from an optical network, a cellular network, the Internet, a Local Area Network ("LAN"), a Wide Area Network ("WAN"), a satellite network, a fiber network, a cable network, and combinations thereof. In an embodiment, the communications network 820 is the Internet. As shown, there may be many server computing systems and many client computing systems connected to each other via the communications network 820. However, it should be appreciated that, for example, a single client computing system can also be connected to a single server computing system. Thus, any combination of server computing systems and client computing systems may connect to each other via the communications network 820. The camera discussed herein can also reside and be implemented in this network environment, for example, in the cloud platform of server 804A and database 806A, the local server 804B and database 806B, on the device such as laptop 802D, in a smart system such as the smart automobile 802D, partially in the cloud platform server 804A and partially in the device, such as laptop 802D, where the two systems communicate and cooperate with each other, and other similar platforms.

In this example, two night vision cameras can use an image sensor with the dynamic defective axle detector and the substitute pixel generator. A night camera on a drone, and a night camera in goggles.

The communications network 820 can connect one or more server computing systems selected from at least a first server computing system 804A and a second server computing system 804B to each other and to at least one or more client computing systems as well. The server computing systems 804A and 804B can each optionally include organized data structures such as databases 806A and 806B. Each of the one or more server computing systems can have one or more virtual server computing systems, and multiple virtual server computing systems can be implemented by design. Each of the one or more server computing systems can have one or more firewalls to protect data integrity.

Examples of the client computing systems can include a first mobile computing device 802A (e.g., smartphone with an Android-based operating system), a second mobile computing device 802E (e.g., smartphone with an iOS-based operating system), a first wearable electronic device 802C (e.g., a smartwatch), a first portable computer 802B (e.g., a laptop computer), a third mobile computing device 802F (e.g., tablet with an Android- or iOS-based operating system), a smart device or system incorporated into a first smart vehicle 802D, a smart IoT device, or system incorporated into a first smart bicycle, a first smart television 802H, a first virtual reality or augmented reality headset 804C, and the like. Each of the one or more client computing systems can have one or more firewalls to protect data integrity.

It should be appreciated that the use of the terms "client computing system" and "server computing system" is intended to indicate the system that generally initiates a communication and the system that generally responds to the communication. For example, a client computing system can generally initiate a communication and a server computing system generally responds to the communication. No hierarchy is implied unless explicitly stated. Both functions can be in a single communicating system or device, in which case, the client-server and server-client relationship can be viewed as peer-to-peer. Thus, if the first portable computer 802B (e.g., the client computing system) and the server computing system 804A can both initiate and respond to communications, their communications can be viewed as peer-to-peer. Additionally, the server computing systems 804A and 804B include circuitry and software enabling communication with each other across the network 820. Server 804B may send, for example, simulator data to server 804A.

Any one or more of the server computing systems can be a cloud provider. A cloud provider can install and operate application software in a cloud (e.g., the network 820 such as the Internet) and cloud users can access the application software from one or more of the client computing systems. Generally, cloud users that have a cloud-based site in the cloud cannot solely manage a cloud infrastructure or platform where the application software runs. Thus, the server computing systems and organized data structures thereof can be shared resources, where each cloud user is given a certain amount of dedicated use of the shared resources. Each cloud user's cloud-based site can be given a virtual amount of dedicated space and bandwidth in the cloud. Cloud applications can be different from other applications in their scalability, which can be achieved by cloning tasks onto multiple virtual machines at run-time to meet changing work demand. Load balancers distribute the work over the set of virtual machines. This process is transparent to the cloud user, who sees only a single access point.

Cloud-based remote access can be coded to utilize a protocol, such as Hypertext Transfer Protocol ("HTTP"), to engage in a request and response cycle with an application on a client computing system such as a web-browser application resident on the client computing system. The cloud-based remote access can be accessed by a smartphone, a desktop computer, a tablet, or any other client computing systems, anytime and/or anywhere. The cloud-based remote access is coded to engage in 1) the request and response cycle from all web browser-based applications, 3) the request and response cycle from a dedicated on-line server, 4) the request and response cycle directly between a native application resident on a client device and the cloud-based remote access to another client computing system, and 5) combinations of these.

In an embodiment, the server computing system 804A can include a server engine, a web page management component or direct application component, a content management component, and a database management component. The server engine can perform basic processing and operating-system level tasks. The web page management component can handle the creation and display or routing of web pages or screens associated with receiving and providing digital content and digital advertisements, through a browser. Likewise, the direct application component may work with a client app resident on a user's device. Users (e.g., cloud users) can access one or more of the server computing systems by means of a Uniform Resource Locator ("URL") associated therewith. The content management component can handle most of the functions in the embodiments described herein. The database management component can include storage and retrieval tasks with respect to the database, queries to the database, and storage of data.

In an embodiment, a server computing system can be configured to display information in a window, a web page, or the like. An application including any program modules, applications, services, processes, and other similar software executable when executed on, for example, the server computing system 804A, can cause the server computing system 804A to display windows and user interface screens in a portion of a display screen space.

Each application has a code scripted to perform the functions that the software component is coded to carry out such as presenting fields to take details of desired information. Algorithms, routines, and engines within, for example, the server computing system 804A can take the information from the presenting fields and put that information into an appropriate storage medium such as a database (e.g., database 806A). A comparison wizard can be scripted to refer to a database and make use of such data. The applications may be hosted on, for example, the server computing system 804A and served to the specific application or browser of, for example, the client computing system 802B. The applications then serve windows or pages that allow the entry of details.

Computing Systems

Figure 9:
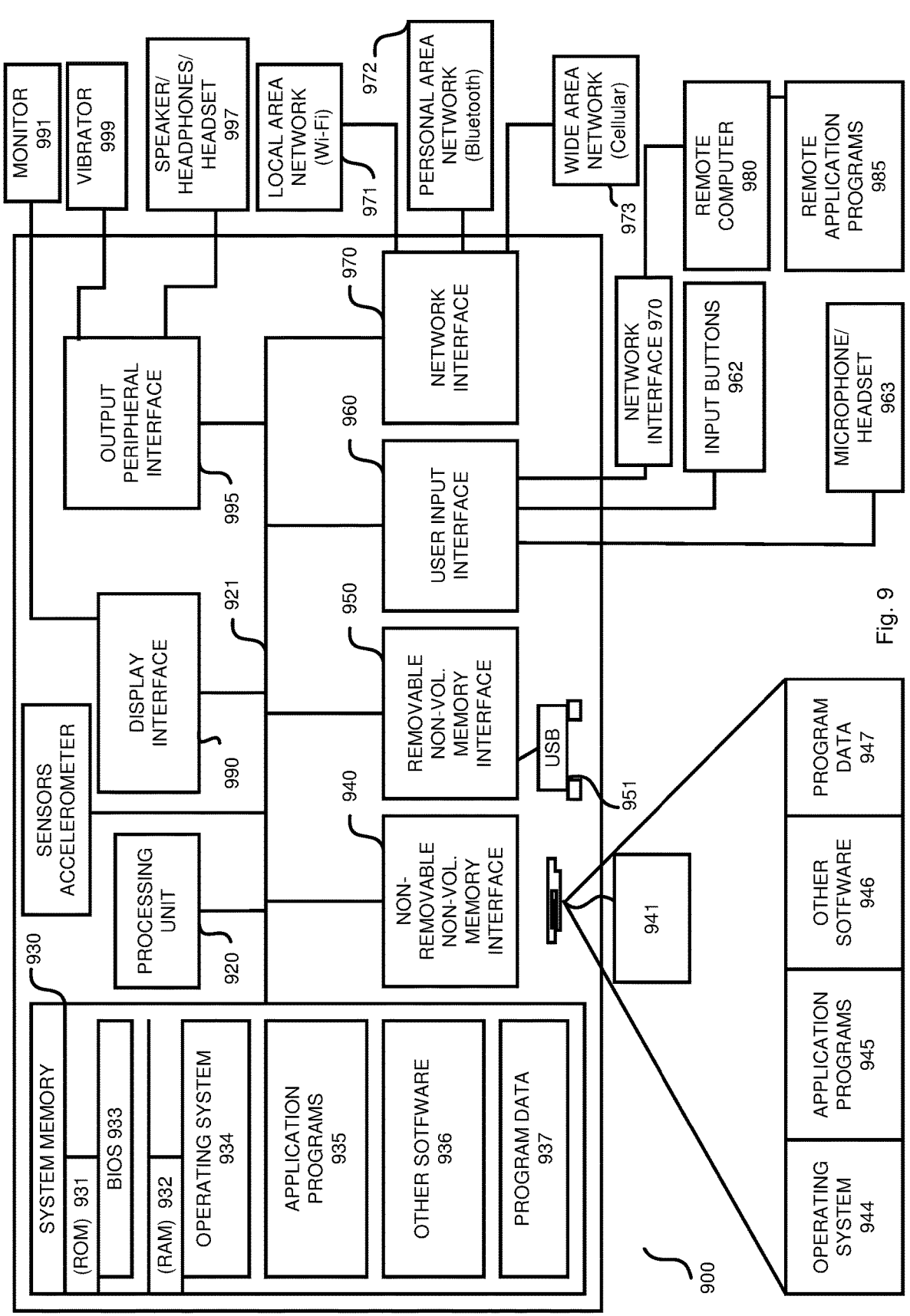
FIG. 9 illustrates a diagram of an embodiment of one or more computing devices that can be a part of the systems associated with firmware stored on a memory with a processor to implement and execute various algorithms and kernels used by components discussed herein.

FIG. 9 illustrates a diagram of an embodiment of one or more computing devices that can be a part of the systems associated with firmware stored on a memory with a processor to implement and execute various algorithms and kernels used by components discussed herein.

The algorithms and kernels can be executed on an example architecture. The example architecture below can be utilized by various computing devices including the cameras discussed herein.

The components of the user's device and/or the certificate authority platforms can be implemented with various parts of a computing device. The computing device 900 may include one or more processors or processing units 920 to execute instructions, one or more memories 930-932 to store information, one or more data input components 960-963 to receive data input from a user of the computing device 900, one or more modules that include the management module, a network interface communication circuit 970 to establish a communication link to communicate with other computing devices external to the computing device, one or more sensors where an output from the sensors is used for sensing a specific triggering condition and then correspondingly generating one or more preprogrammed actions, a display screen 991 to display at least some of the information stored in the one or more memories 930-932 and other components. Note, portions of this system that are implemented in software 944, 945, 946 may be stored in the one or more memories 930-932 and are executed by the one or more processors 920.

The system memory 930 includes computer storage media in the form of volatile and/or nonvolatile memory such as read-only memory (ROM) 931 and random access memory (RAM) 932. These computing machine-readable media can be any available media that can be accessed by computing system 900. By way of example, and not limitation, computing machine-readable media use includes storage of information, such as computer-readable instructions, data structures, other executable software, or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 900. Transitory media such as wireless channels are not included in the machine-readable media.

The system further includes a basic input/output system 933 (BIOS) containing the basic routines that help to transfer information between elements within the computing system 900, such as during start-up, is typically stored in ROM 931. RAM 932 typically contains data and/or software that are immediately accessible to and/or presently being operated on by the processing unit 920. By way of example, and not limitation, the RAM 932 can include a portion of the operating system 934, application programs 935, other executable software 936, and program data 937.

The computing system 900 can also include other removable/non-removable volatile/nonvolatile computer storage media. By way of example only, the system has a solid-state memory 941. The solid-state memory 941 is typically connected to the system bus 921 through a non-removable memory interface such as interface 940, and USB drive 951 is typically connected to the system bus 921 by a removable memory interface, such as interface 950.

A user may enter commands and information into the computing system 900 through input devices such as a keyboard, touchscreen, or software or hardware input buttons 962, a microphone 963, a pointing device and/or scrolling input component, such as a mouse, trackball or touch pad. These and other input devices are often connected to the processing unit 920 through a user input interface 960 that is coupled to the system bus 921, but can be connected by other interface and bus structures, such as a parallel port, game port, or a universal serial bus (USB). A display monitor 991 or other type of display screen device is also connected to the system bus 921 via an interface, such as a display interface 990. In addition to the monitor 991, computing devices may also include other peripheral output devices such as speakers 997, a vibrator 999, and other output devices, which may be connected through an output peripheral interface 995.

The computing system 900 can operate in a networked environment using logical connections to one or more remote computers/client devices, such as a remote computing system 980. The remote computing system 980 can a personal computer, a mobile computing device, a server, a router, a network PC, a peer device or other common network node, and typically includes many or all of the elements described above relative to the computing system 900. The logical connections can include a personal area network (PAN) 972 (e.g., Bluetooth®), a local area network (LAN) 971 (e.g., Wi-Fi), and a wide area network (WAN) 973 (e.g., cellular network), but may also include other networks such as a personal area network (e.g., Bluetooth®). Such networking environments are commonplace in offices, enterprise-wide computer networks, intranets and the Internet. A browser application may be resonant on the computing device and stored in the memory.

When used in a LAN networking environment, the computing system 900 is connected to the LAN 971 through a network interface 970, which can be, for example, a Bluetooth® or Wi-Fi adapter. When used in a WAN networking environment (e.g., Internet), the computing system 900 typically includes some means for establishing communications over the WAN 973. With respect to mobile telecommunication technologies, for example, a radio interface, which can be internal or external, can be connected to the system bus 921 via the network interface 970, or other appropriate mechanism. In a networked environment, other software depicted relative to the computing system 900, or portions thereof, may be stored in the remote memory storage device. By way of example, and not limitation, the system has remote application programs 985 as residing on remote computing device 980. It will be appreciated that the network connections shown are examples and other means of establishing a communications link between the computing devices that may be used.

As discussed, the computing system 900 can include mobile devices with a processing unit 920, a memory (e.g., ROM 931, RAM 932, etc.), and a built-in battery to power the computing device, an AC power input to charge the battery, a display screen, and a built-in Wi-Fi circuitry to wirelessly communicate with a remote computing device connected to the network.

It should be noted that the present design can be carried out on a computing system such as that described with respect to shown herein. However, the present design can be carried out on a server, a computing device devoted to message handling, or on a distributed system in which different portions of the present design are carried out on different parts of the distributed computing system.

In some embodiments, software used to facilitate algorithms discussed herein can be embedded onto a non-transitory machine-readable medium. A machine-readable medium includes any mechanism that stores information in a form readable by a machine (e.g., a computer). For example, a non-transitory machine-readable medium can include read-only memory (ROM); random access memory (RAM); magnetic disk storage media; optical storage media; flash memory devices; Digital Versatile Disc (DVD's), EPROMS, EEPROMs, FLASH memory, magnetic or optical cards, or any type of media suitable for storing electronic instructions.

Note, an application described herein includes but is not limited to software applications, mobile applications, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as C, C++, HTTP, Java, Python, or other similar languages. Also, an algorithm can be implemented with lines of code in software, configured logic gates in software, or a combination of both. In an embodiment, the logic consists of electronic circuits that follow the rules of Boolean Logic, software that contain patterns of instructions, or any combination of both. Any portions of an algorithm implemented in software can be stored in an executable format in a portion of a memory and is executed by one or more processors. In an embodiment, a module can be implemented in electronic hardware such as logic and other electronic components to perform the functions discussed for that module, software as a block of executable code coded to perform the functions discussed for that module, and/or a combination of software cooperating with electronic hardware.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

Many functions performed by electronic hardware components can be duplicated by software emulation. Thus, a software program written to accomplish those same functions can emulate the functionality of the hardware components in input-output circuitry. Thus, provided herein are one or more non-transitory machine-readable medium configured to store instructions and data that when executed by one or more processors on the computing device of the foregoing system, causes the computing device to perform the operations outlined as described herein.

References in the specification to "an embodiment," "an example", etc., indicate that the embodiment or example described may include a particular feature, structure, or characteristic, but every embodiment may not necessarily include the particular feature, structure, or characteristic. Such phrases can be not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

What is claimed is:

1. An apparatus, comprising:
an image sensor with a pixel array, where the pixel array has two or more pixels,
a defective pixel detector that is configured to detect a defective pixel, where a dynamic threshold range is based on amplitude levels of neighboring pixels,
where the defective pixel detector is configured to detect the defective pixel with the dynamic threshold range to detect and determine a defective status for the pixel under analysis based on an amplitude level of the pixel under analysis relative to the amplitude levels of neighboring pixels, and
where the defective pixel detector is configured to apply one or more algorithms to create candidate pixel patterns for the neighboring pixels used to create the dynamic threshold range, where a value of the dynamic threshold range will change based on the amplitude levels of the neighboring pixels, where an amplitude detector is configured to determine the amplitude level of the pixel under analysis and then supply that to the defective pixel detector, where the amplitude level detected by the amplitude detector includes at least a dark current noise determined by one of i) a measurement of the dark current noise or ii) a mathematical determination of the dark current noise of the pixel under analysis.

2. The apparatus of claim 1, further comprising:
where the defective pixel detector is configured to detect the defective pixel, after the image sensor with the pixel array has been put into operation, based on the amplitude level of the pixel under analysis, relative to the amplitude levels of neighboring pixels,
where the defective pixel detector is configured to apply a first algorithm with a corresponding pixel candidate pattern of two or more of the neighboring pixels to create the dynamic threshold range used to detect the defective pixel, and
where a substitute pixel value generator is configured to generate a pixel correction value based on a different set of two or more of the neighboring pixels to create the pixel correction value.

3. The apparatus of claim 1, where the defective pixel detector is configured to identify one or more defective pixels using at least an amplitude level detector to assess the pixel under analysis as well as the neighboring pixels, and a substitute pixel value generator configured to provide pixel value correction over an operational life span of the pixel array with the two or more pixels when the one or more defective pixels become defective during the operational life span of the pixel array, where the neighboring pixels are selected from pixels that are up to four pixels away the pixel under analysis but less than an entire set of pixels in the array.

4. The apparatus of claim 1, where the defective pixel detector is further configured to apply one or more algorithms with candidate pixel patterns supplied by a judgment kernel to create the dynamic threshold range used to compare 1) the amplitude level of a pixel value of the pixel under analysis to at least one of i) a range of median values and ii) an average value of the amplitude levels of a first pattern of neighboring pixels indicated by the judgment kernel, 2) a shape of the pixel value of the pixel under analysis to a shape of pixel values of neighboring pixels, and any combination of 1) and 2).

5. The apparatus of claim 1, where a substitute pixel value generator is configured to generate a pixel correction value dynamically based on pixel values of two or more neighboring pixels to determine and then substitute the pixel correction value for a pixel value of the defective pixel, where at least one of i) a median value of the pixel values of the two or more neighboring pixels and ii) an average value of the pixel values of the two or more neighboring pixels is substituted as the pixel correction value for the pixel value of the defective pixel.

6. The apparatus of claim 1, where a substitute pixel value generator is configured to generate a pixel correction value when a comparison is made between i) a pixel value of the pixel under analysis to ii) a dynamic threshold range plus a fractional factor, and when the pixel value of the pixel under analysis is outside the dynamic threshold range plus the fractional factor, then the substitute pixel value generator is configured to i) determine that the pixel under analysis is defective, and then ii) substitute 1) the pixel correction value for 2) the pixel value of the defective pixel.

7. The apparatus of claim 1, where the defective pixel detector is configured to apply a first algorithm with a corresponding pixel candidate pattern of the neighboring pixels to create a dynamic threshold range used to detect the defective pixel, where the dynamic threshold range is based on both i) the noise level of the neighboring pixels and ii) a light signal level captured by the neighboring pixels.

8. A method for an image sensor, comprising:
configuring an image sensor with a pixel array, where the pixel array has two or more pixels,
configuring a defective pixel detector to detect a defective pixel, where a dynamic threshold range is based on amplitude levels of neighboring pixels,
configuring the defective pixel detector to detect the defective pixel with the dynamic threshold range to detect and determine a defective status for the pixel under analysis based on an amplitude level of the pixel under analysis relative to the amplitude levels of neighboring pixels,
configuring the defective pixel detector to apply one or more algorithms to create candidate pixel patterns for the neighboring pixels used to create the dynamic threshold range, where a value of the dynamic threshold range will change based on the amplitude levels of the neighboring pixels, and
configuring a substitute pixel value generator to generate a pixel correction value when a comparison is made between i) a pixel value of the pixel under analysis to ii) a dynamic threshold range plus a fractional factor, and when the pixel value of the pixel under analysis is outside the dynamic threshold range plus the fractional factor, then the substitute pixel value generator is configured to i) determine that the pixel under analysis is defective, and then ii) substitute 1) the pixel correction value for 2) the pixel value of the defective pixel.

9. The method for the image sensor of claim 8, further comprising:

configuring a defective pixel detector to detect a defective pixel, after the image sensor with the pixel array has been put into operation, based on the amplitude level of the pixel under analysis, relative to the amplitude levels of neighboring pixels.

10. The method for the image sensor of claim 8, further comprising:

configuring the defective pixel detector to identify one or more defective pixels using at least an amplitude level detector to assess the pixel under analysis as well as the neighboring pixels, and a substitute pixel value generator configured to provide pixel value correction over an operational life span of the pixel array with the two or more pixels when the one or more defective pixels become defective during the operational life span of the pixel array.

11. The method for the image sensor of claim 8, further comprising:

configuring an amplitude detector to determine the amplitude level of the pixel under analysis and then supply that to the defective pixel detector, where the amplitude level detected by the amplitude detector includes at least a dark current noise determined by one of i) a measurement of the dark current noise or ii) a mathematical determination of the dark current noise of the pixel under analysis.

12. The method for the image sensor of claim 8, further comprising:

configuring the defective pixel detector to apply one or more algorithms with candidate pixel patterns supplied by a judgment kernel to create the dynamic threshold range used to compare 1) the amplitude level of a pixel value of the pixel under analysis to at least one of i) a range of median values and ii) an average value of the amplitude level of a first pattern of neighboring pixels indicated by the judgment kernel, 2) a shape of the pixel value of the pixel under analysis to a shape of pixel values of neighboring pixels, and any combination of 1) and 2), where the neighboring pixels are selected from pixels that are up to four pixels away the pixel under analysis but less than an entire set of pixels in the array.

13. The method for the image sensor of claim 8, further comprising:

configuring a substitute pixel value generator to generate a pixel correction value dynamically based on pixel values of two or more neighboring pixels to determine and then substitute the pixel correction value for a pixel value of the defective pixel, where at least one of i) a median value of the pixel values of the two or more neighboring pixels and ii) an average value of the pixel values of the two or more neighboring pixels is substituted as the pixel correction value for the pixel value of the defective pixel.

14. The method for the image sensor of claim 8, further comprising:

configuring the defective pixel detector to apply a first algorithm with a corresponding pixel candidate pattern of the neighboring pixels to create a dynamic threshold range used to detect the defective pixel, where the dynamic threshold range is based on both the noise level of the neighboring pixels and a light signal level captured by the neighboring pixels.

15. The method for the image sensor of claim 8, further comprising:

configuring the defective pixel detector to apply a first algorithm with a corresponding pixel candidate pattern of two or more of the neighboring pixels to create the dynamic threshold range used to detect the defective pixel, and configuring a substitute pixel value generator to generate a pixel correction value based on a different set of two or more of the neighboring pixels to create the pixel correction value.

16. A system, comprising:

a camera with an image sensor with a pixel array, where the pixel array has two or more pixels, a defective pixel detector configured to detect a defective pixel, where a dynamic threshold range is based on amplitude levels of neighboring pixels, where the defective pixel detector is configured to detect the defective pixel with the dynamic threshold range to detect and determine a defective status for the pixel under analysis based on an amplitude level of the pixel under analysis relative to the amplitude levels of neighboring pixels, where the defective pixel detector is configured to apply one or more algorithms to create candidate pixel patterns for the neighboring pixels used to create the dynamic threshold range, where a value of the dynamic threshold range will change based on the amplitude levels of the neighboring pixels, a substitute pixel value generator configured to generate a pixel correction value when the defective pixel detector determine the defective status for the pixel under analysis, a random telegraph noise detector, a dark current noise detector, and a pixel read noise detector are configured to detect the noise level of the neighboring pixels, where the random telegraph noise detector, the dark current noise detector, and the pixel read noise detector are further configured to combine to provide a noise input into the defective pixel detector, and where the defective pixel detector is further configured to couple to and communicate with a substitute pixel value generator in order to generate a pixel correction value for the defective pixel based on a dynamic threshold range determined from inputs of the random telegraph noise detector, the dark current noise detector, the pixel read noise detector.

17. The system of claim 16, where the system is night vision goggles containing the camera, the image sensor, the defective pixel detector, and the substitute pixel value generator.

* * * * *